(12) United States Patent
Accardo et al.

(10) Patent No.: US 10,296,921 B2
(45) Date of Patent: May 21, 2019

(54) SYSTEM AND METHOD FOR EVENT CONTEXT-BASED COMMERCE OPTIONS

(75) Inventors: Anthony Accardo, Glendale, CA (US); Amber Brown, Sierra Madre, CA (US); Joe Marks, Pasadena, CA (US)

(73) Assignee: Disney Enterprises, Inc., Burbank, CA (US)

( * ) Notice: Subject to any disclaimer, the term of this patent is extended or adjusted under 35 U.S.C. 154(b) by 739 days.

(21) Appl. No.: 13/165,459

(22) Filed: Jun. 21, 2011

(65) Prior Publication Data

US 2012/0330734 A1    Dec. 27, 2012

(51) Int. Cl.
*G06Q 30/00* (2012.01)
*G06Q 30/02* (2012.01)

(52) U.S. Cl.
CPC .................................. *G06Q 30/02* (2013.01)

(58) Field of Classification Search
None
See application file for complete search history.

(56) References Cited

U.S. PATENT DOCUMENTS

| | | | |
|---|---|---|---|
| 7,444,353 B1 | 10/2008 | Chen | |
| 2001/0001145 A1* | 5/2001 | Barnett et al. | 705/14 |
| 2006/0224456 A1* | 10/2006 | Walker et al. | 705/14 |
| 2007/0179854 A1* | 8/2007 | Ziv et al. | 705/14 |
| 2007/0250901 A1* | 10/2007 | McIntire et al. | 725/146 |
| 2008/0046320 A1 | 2/2008 | Farkas | |
| 2008/0076414 A1* | 3/2008 | Kharebov et al. | 455/433 |
| 2009/0298481 A1* | 12/2009 | Hurst | 455/414.1 |
| 2009/0307067 A1* | 12/2009 | Obermeyer | 705/14.1 |
| 2009/0327151 A1* | 12/2009 | Carlson et al. | 705/80 |
| 2011/0066507 A1* | 3/2011 | Iyer et al. | 705/14.66 |
| 2011/0098029 A1* | 4/2011 | Rhoads et al. | 455/418 |
| 2011/0098056 A1* | 4/2011 | Rhoads et al. | 455/456.1 |
| 2011/0112913 A1* | 5/2011 | Murray | 705/14.73 |
| 2011/0320539 A1* | 12/2011 | Zhao et al. | 709/206 |
| 2012/0089465 A1* | 4/2012 | Froloff | 705/14.71 |

* cited by examiner

*Primary Examiner* — Michael W Schmucker
(74) *Attorney, Agent, or Firm* — Farjami & Farjami LLP

(57) ABSTRACT

There is provided a system and method for providing context-based limited availability commerce options. There is provided a method comprising receiving a sensor data sample corresponding to a segment for an event, matching the sensor data sample to a media record in a media database, the media record including an identity of the event, generating an advertising campaign of limited availability commerce options using a context including the identity of the event and a location of a device, and presenting the advertising campaign on a display of the device. When the event corresponds to a theatrical movie showing, the segment may correspond to the first few measures of a song for an end credit roll, and the sensor data sample may be recorded from a microphone. The commerce options may be limited based on time, location, demographics, user or group participation, and other criteria.

18 Claims, 4 Drawing Sheets

Fig. 2B

Device 210a

Display 215a

We hope you enjoyed watching "Doll Story". Here are your personalized deals!

Doll Story (Blu Ray)
1% off per person in the deal! (Max 50% off!)
Touch to Join & Share!

Blue Robin
3 joined, 4 required for 30% off coupon!
Touch to Join!

Device 210b

Display 215b

We hope you enjoyed watching "Doll Story". Here are your personalized deals!

Doll Story (Blu Ray)
1% off per person in the deal! (Max 50% off!)
Touch to Join & Share!

Blue Robin
3 joined, 4 required for 30% off coupon!
In the deal!

Device 210c

Display 215c

We hope you enjoyed watching "Doll Story". Here are your personalized deals!

Doll Story (Blu Ray)
1% off per person in the deal! (Max 50% off!)
Touch to Join & Share!

Blue Robin
3 joined, 4 required for 30% off coupon!
In the deal!

Device 210d

Display 215d

We hope you enjoyed watching "Doll Story". Here are your personalized deals!

Doll Story (Blu Ray)
1% off per person in the deal! (Max 50% off!)
Touch to Join & Share!

Blue Robin
3 joined, 4 required for 30% off coupon!
In the deal!

SYSTEM AND METHOD FOR EVENT CONTEXT-BASED COMMERCE OPTIONS

BACKGROUND OF THE INVENTION

1. Field of the Invention

The present invention relates generally to advertisement and commerce options. More particularly, the present invention relates to context-based commerce options presented on mobile devices.

2. Background Art

Entertainment and event venues such as movie theaters and concert halls provide something for everyone with genres ranging from comedy, music, drama, action, and more. The shared social context provided by attending an event with fellow audience members allows the audience to be drawn into the atmosphere of the event, providing a heightened emotional experience. Special events such as midnight or advance movie screenings can also provide an enhanced sense of anticipation and camaraderie.

While ticket receipts provide one stream of income for content producers, related products and services also provide important, if not more important revenue streams. Related products and services may include home release media such as DVD or Blu-ray discs, merchandise and toys, associated theme park or event tickets, restaurant dining, and more. Unfortunately, some of these goods and services may not be available until a future date. For example, home releases of movies are usually delayed for several months after associated theatrical releases. By this time, positive memories of the event may wane from audience minds, negatively affecting sales of such products and services.

Thus, it would be optimal to present the opportunity to purchase related products and services immediately after the end of the event, while the positive and exciting experience is still hot and fresh in audience minds. However, existing marketing methods fail to present sales opportunities at that crucial time when audiences may be most receptive to commercial messages. For example, e-mail marketing, direct mail marketing, and social networking campaigns may not be delivered to the audience until a considerable amount of time has passed since the end of the event.

Accordingly, there is a need to overcome the drawbacks and deficiencies in the art by providing a way for the audience of an event venue to purchase related products or services at an optimal time while positive emotions are strongest.

SUMMARY OF THE INVENTION

There are provided method and system for event context-based commerce options, substantially as shown in and/or described in connection with at least one of the figures as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 2B presents a diagram of nearby mobile devices showing user interfaces for navigating group for context-based commerce options after media events, according to one embodiment of the present invention.

DETAILED DESCRIPTION OF THE INVENTION

The present application is directed to a method and system for event context-based commerce options. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
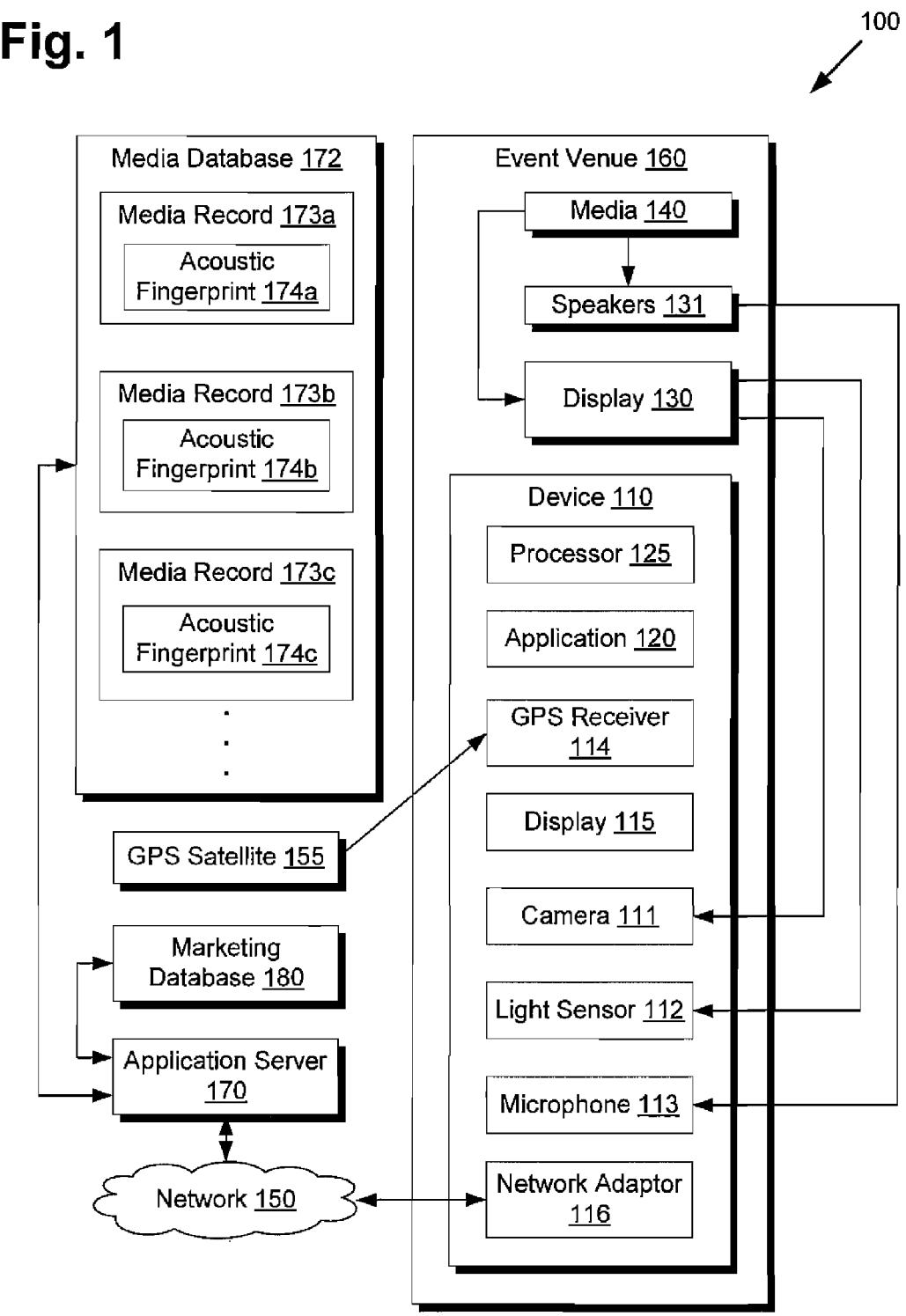
FIG. 1 presents a diagram of a system for providing event context-based commerce options, according to one embodiment of the present invention.

FIG. 1 presents a diagram of a system for providing event context-based commerce options, according to one embodiment of the present invention. Diagram 100 of FIG. 1 includes event venue 160, GPS satellite 155, marketing database 180, media database 172, application server 170, and network 150. Media database 172 includes media records 173a, 173b, and 173c, which respectively include acoustic fingerprints 174a, 174b, and 174c. Event venue 160 includes media 140, speakers 131, display 130, and device 110. Device 110 includes processor 125, application 120, GPS receiver 114, display 115, camera 111, light sensor 112, microphone 113, and network adaptor 116.

Event venue 160 may comprise a movie theater, a concert hall, or any other recorded or live entertainment venue. Each person in the audience of event venue 160 may carry a device similar to device 110, which may comprise a mobile phone, a smart phone, a tablet, or another mobile device having connectivity to network 150. While only one device 110 is shown in FIG. 1, multiple devices may be present in event venue 160. Media 140 may comprise any recorded media such as a feature film. Video may be output to display 130, for example through a video projector, and audio may be output to speakers 131, for example through an audio amplifier.

Device 110 may execute application 120 on processor 125. For example, the user of device 110 may have previously downloaded application 120. Application 120 may comprise a standalone application or may be bundled with another application. When the user of device 110 approaches an event venue, application 120 may automatically execute as a background process. For example, GPS receiver 114 may determine a location of device 110 using GPS satellite 155. Alternatively, if GPS receiver 114 is unable to receive a signal from GPS satellite 155, alternative location tracking methods may be utilized such as Wi-Fi triangulation. Processor 125 may be configured to compare the location of device 110 to a database of known event venue locations to determine that device 110 is approaching event venue 160. Processor 125 may then execute application 120 as a background process. Alternatively, the user of device 110 may manually launch application 120, which may run as a foreground or background process.

After the conclusion of the main media event, for example after a main movie portion of media 140 is played back, or after the end of a live concert, a portion, such as an ending portion, of media 140 may be played back on display 130 and speakers 131. The ending portion may, for example, comprise a credits roll with background music. Application 120, which may be executing in the background during this time, may analyze the output of display 130 and speakers 131 using various sensors installed on device 110. For example, camera 111 may detect video patterns from display 130, such as one or two-dimensional barcodes or other recognizable visuals. Light sensor 112 may detect patterns of light intensity from display 130. Microphone 113 may record audio outputted from speakers 131. Portions of recorded data from these sensors may be analyzed against media database 172 to identify media 140.

For example, application 120 may periodically generate an acoustic fingerprint sample from recorded audio segments of microphone 113 using an acoustic fingerprinting algorithm, as is known in the art. Application 120 may then periodically send the acoustic fingerprint sample to application server 170 through network 150, which may comprise a public network such as the Internet. Device 110 may access network 150 through network adaptor 116, which may comprise a Wi-Fi, Wi-Max, 3G, or other wireless adaptor. Intermediate access devices such as femtocells or Wi-Fi routers may facilitate connectivity between network adaptor 116 and network 150.

Application server 170 may receive the acoustic fingerprint sample and query media database 172 to determine a matching media record. For example, the acoustic fingerprint sample may be compared against acoustic fingerprints 174a, 174b, and 174c, which may correspond to beginning passages of end credit soundtracks for various movies. Application server 170 may then, for example, determine that the acoustic fingerprint sample most closely matches acoustic fingerprint 174a, which is associated with media record 173a. For example, if the ending song that runs during the end credits for media 140 is the song "Beautiful Day", then acoustic fingerprint 174a may correspond to the first few measures of the "Beautiful Day" song. Media record 174a may then include a media title identifier record, for example indicating that the associated media title is a movie titled "Doll Story". Thus, application 120 can identify that media 140 playing at event venue 160 is the movie "Doll Story". If no matching media records are found in media database 172, then application 120 may simply continue recording and querying application server 170 with acoustic fingerprint samples. When a match from media database 172 is found, application 120 knows that the post-event end credits for media 140 are presently being played.

While only three media records are shown in media database 172, alternative embodiments may include any number of media records. Additionally, besides acoustic fingerprints, other types of digital fingerprints may also be associated with media records. For example, each media record may include a two-dimensional barcode, and camera 111 may provide a data sample of a two-dimensional barcode displayed on display 130. In other embodiments, each media record may be associated with a pattern of light intensity, and light sensor 112 may provide a data sample of light intensities from display 130. Thus, each media record in media database 172 may contain one or more types of digital fingerprints to match against sensor data samples received from device 110.

Additionally, while media database 172 is shown as separate from device 110, in some embodiments, portions of media database 172 may be cached on device 110. For example, application 120 may periodically download a portion of media database 172 pertaining only to recent theatrical releases, allowing application 120 to conduct the digital fingerprint analysis directly rather than querying application server 170.

Application 120 may then use all known context available to it to provide context-based commerce options to the user of device 110. For example, as described above, a location of device 110 may be retrieved from GPS satellite 155 or Wi-Fi triangulation, and an event identity of media 140 may be retrieved from media record 173a as the movie "Doll Story" which is targeted towards a family friendly demographic. Furthermore, any available user profile information of device 110, for example social networking profiles or browsing history, may also be utilized as context to personalize the marketing campaign. Application 120 may then forward the above context to application server 170, which may use the context to retrieve a tailored marketing campaign from marketing database 180. The marketing campaign may then be attractively formatted and presented to the user on display 115 of device 110.

For example, since it is known that media 140 is the "Doll Story" movie, display 115 may show commerce options to pre-order or purchase media such as a "Doll Story" DVDs, Blu-ray discs, digital video and soundtrack downloads, and other "Doll Story" merchandise. Coupons, promotions, and recommendations may also be presented to the user that are contextually relevant for a family friendly demographic, such as the option to make dinner reservations at a nearby family restaurant or to purchase tickets for a family friendly event or admission to a local theme park. In addition, personal preferences from user profile information may be utilized to further target the commercial options presented to the user. For example, if the user expresses preference for a specific type of cuisine, then restaurants serving that specific type of cuisine may be shown more often.

Accordingly, commerce options may be presented to the user of device 110 to suit different contexts. For example, if media 140 instead comprised a movie targeted towards an older male demographic, then marketing database 180 may adjust to the different context by providing a marketing campaign targeted towards an older male demographic. Thus, a sports bar might be recommended instead of a family restaurant, and tickets for a nightclub might be offered instead of tickets for a theme park.

Advantageously, the marketing campaign is presented to the user of device 110 directly after playback of the main portion of media 140, or post-event, when the user may be most interested in purchasing related products and services. Additionally, besides any initial downloading and setup of application 120, the user may be free from any requirement to manually configure application 120. For example, as previously described, application 120 may automatically launch as a background process when GPS receiver 114 detects proximity to an event venue, such as event venue 160. Alternatively, application 120 may run continuously in the background automatically. The sensors of device 110, such as microphone 113, may operate silently in the background. Data samples from microphone 113 or other sensors may thus be periodically recorded and sent to application server 170, optionally in a fingerprinted format. Once application server 170 finds a positive match from media database 172, marketing database 180 may be queried to provide a context-based marketing campaign, which application 120 may then present on display 115, without any affirmative user intervention. Additionally, application 120 may alert the user of device 110 to look at display 115, for example through an audible chime or by vibration of device 110. Thus, since no additional affirmative steps are required from the user, the user of device 110 can advantageously browse various commerce options with minimal effort and hassle.

Additionally, some of these commerce options may be made exclusive to application 120 to further encourage spur of the moment impulse purchases. For example, commerce options may have a limited time window of validity such as within one hour after the end of the media event. In other embodiments, commerce options may only be redeemable when device 110 is within proximity to a location of the event, or event venue 160. In yet other embodiments, commerce options may be locked until the user of device 110 reaches some participation threshold in an activity, for example by playing a simple game, answering a trivia question, or watching a video.

By limiting the availability of the commerce options to select users meeting certain minimal criteria, an air of exclusivity and desirability may be provided. For example, fans may show their loyalty and dedication by securing limited edition items only available to audience members within proximity to event venue 160. Fans may then enjoy the pride of ownership and the fun of sharing their exclusive merchandise collections with other fans. In another example, fans may share their exclusive deals and discounts to others via social networking. For example, a user might post a status update, showing a picture of a 50% off discounted dessert entrée that was exclusively offered to movie attendees of a particular movie theater. Other users in the social network may then become interested in gaining similar discounts and may be persuaded to download and install application 120 as well, creating synergistic networking effects.

Commerce options may also be limited by group activity participation to provide group based discounts and promotions. For example, if several devices running application 120 are present in event venue 160, then each of the devices may display a group based offer where a certain minimum number of people may participate in a group activity to unlock a special discount, or a larger number of people may participate in a group activity to obtain a greater discount. Network 150, near field communications, ad-hoc networks, and other communication channels may be utilized to organize the group discounts and to spread group offers and promotions between nearby devices. Thus, attractive incentives for downloading and installing application 120 may be provided.

Figure 2A:
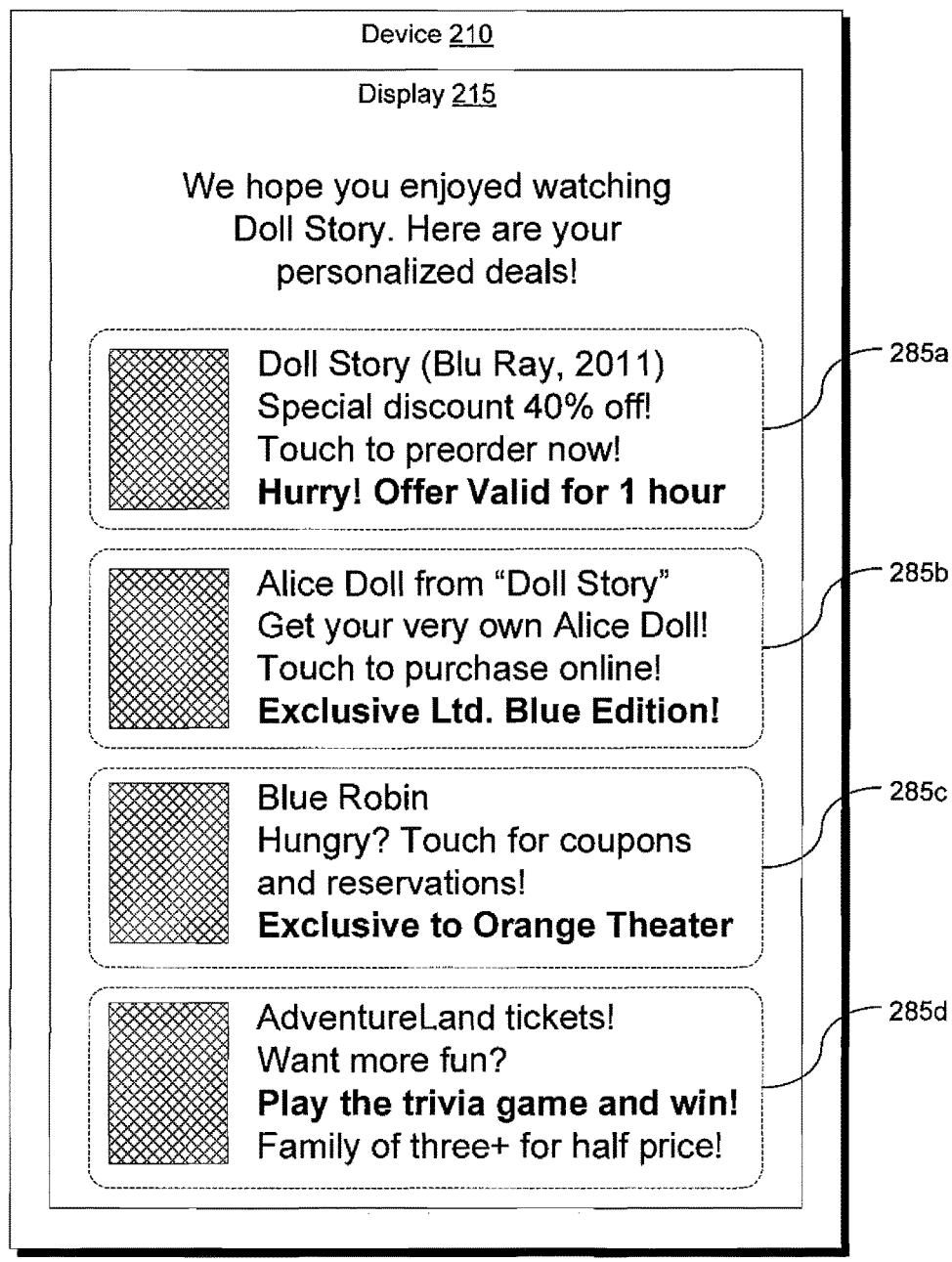
FIG. 2A presents a mobile device showing a user interface for navigating context-based commerce options after media events, according to one embodiment of the present invention.

Moving to FIG. 2A, FIG. 2A presents a mobile device showing a user interface for navigating context-based commerce options after media events, according to one embodiment of the present invention. Device 210 of FIG. 2A includes display 215. Display 215 includes commerce option 285a, 285b, 285c, and 285d. With regards to FIG. 2A, device 210 may correspond to device 110 from FIG. 1, and display 215 may correspond to display 115 from FIG. 1.

After device 210 confirms that the post-event end credits are presently playing, for example by using device sensors and a digital fingerprint media database as described above, a user interface similar to that shown in display 215 may be presented to the user. Thus, an application executing on device 210 may be aware that an identity of the event is the movie "Doll Story" and may thus provide the welcoming message, "We hope you enjoyed watching Doll Story", as shown on display 215.

Various commerce options are also shown on display 215. Commerce option 285a provides a preorder for media of the event, or a Blu-ray disc, and is limited by a one-hour time window after the end of the event. Digital downloads, soundtracks, and other related media may also be offered. Commerce option 285b provides an offer to purchase exclusive related merchandise, or a doll "Alice" that may be a character from the "Doll Story" movie. The doll may be a limited edition blue color and exclusive to users of application 120 from FIG. 1. Thus, normal retail channels may only stock regular edition colors, such as red, since the blue color is exclusively for users of application 120. Commerce option 285c provides an offer for coupons and reservations to a nearby family restaurant "Blue Robin", which may specialize in traditional American fare. For example, a user profile for device 210 may indicate a preference for American food, resulting in commerce option 285c being displayed, rather than commerce options for other types of cuisines. Thus, commerce options may be limited based on demographics. Additionally, commerce option 285c may be offered exclusively to attendees of "Orange Theater". For example, referring to FIG. 1, GPS receiver 114 may be utilized to determine that event venue 160 corresponds to the "Orange Theater" before offering commerce option 285c. Commerce option 285d provides an offer for discounted tickets to a local theme park. Additionally, commerce option 285d may be unlocked only after participating in a trivia game. Thus, commerce options 285a through 285d are tailored to a specific context, which may include the identity of the event as the movie "Doll Story", the location of device 210, and user profile data for device 210. Additionally, as discussed above, commerce options 285a through 285d may be limited by time, location, demographics, user participation, and other factors.

Moving to FIG. 2B, FIG. 2B presents a diagram of nearby mobile devices showing user interfaces for navigating group for context-based commerce options after media events, according to one embodiment of the present invention. Diagram 200 of FIG. 2B includes device 210a, 210b, 210c, and 210d. Device 210a includes display 215a. Device 210b includes display 215b. Device 210c includes display 215c. Device 210d includes display 215d. With regards to FIG. 2B, devices 210a through 210d may each correspond to device 110 from FIG. 1, and displays 215a through 215d may each correspond to display 115 from FIG. 1.

Devices 210a through 210d may be nearby each other, for example by all being within the same event venue such as event venue 160 in FIG. 1. Similar to FIG. 2A, devices 210a through 210d in FIG. 2B may each confirm that the post-event end credits are presently playing to present user interfaces similar to that shown in displays 215a through 215d. As shown in FIG. 2B, displays 215a through 215d may show group for context-based commerce options including various promotions and discounts.

The first group based promotion shown on displays 215a through 215d provides for an incremental discount on the preorder of the "Doll Story" Blu-ray disc, wherein each person that commits to a preorder increases the product discount by one percent, up to a maximum of 50% off. The promotion further invites users to share the deal with others, as indicated by the "Touch to Join & Share!" call out. For example, as previously described, devices may communicate with each other using a network, near field communications, ad-hoc networks, or other communication channels.

In this manner, social networks and groups may be utilized to spread and promote group-based deals.

The second group based promotion shown on displays 215*a* through 215*d* provides for unlocking a 30% coupon for the "Blue Robin" restaurant, wherein at least 4 people must commit to a reservation. As shown by display 215*c* and 215*d*, the users of devices 210*b*, 210*c* and 210*d* may have already committed for a reservation, as indicated by the "In the deal!" call out. However, the user of device 210*a* may be still undecided, as indicated by the "Touch to Join!" call out. Thus, the other users might try to persuade the user of device 210*a* to join them at the "Blue Robin" restaurant so they can unlock the 30% discount coupon. In this manner, social networks and groups may be utilized to encourage greater deal participation and thus larger sales volume. Furthermore, as previously described, various limitations and restrictions may be attached to the group based commerce options to provide an air of exclusivity and greater desirability. For example, before being able to join in a group deal, each user might be required to answer a simple trivia question or to provide some other measure of group participation. Restrictions based on time, location, demographics, and other factors may also be used.

Figure 3:
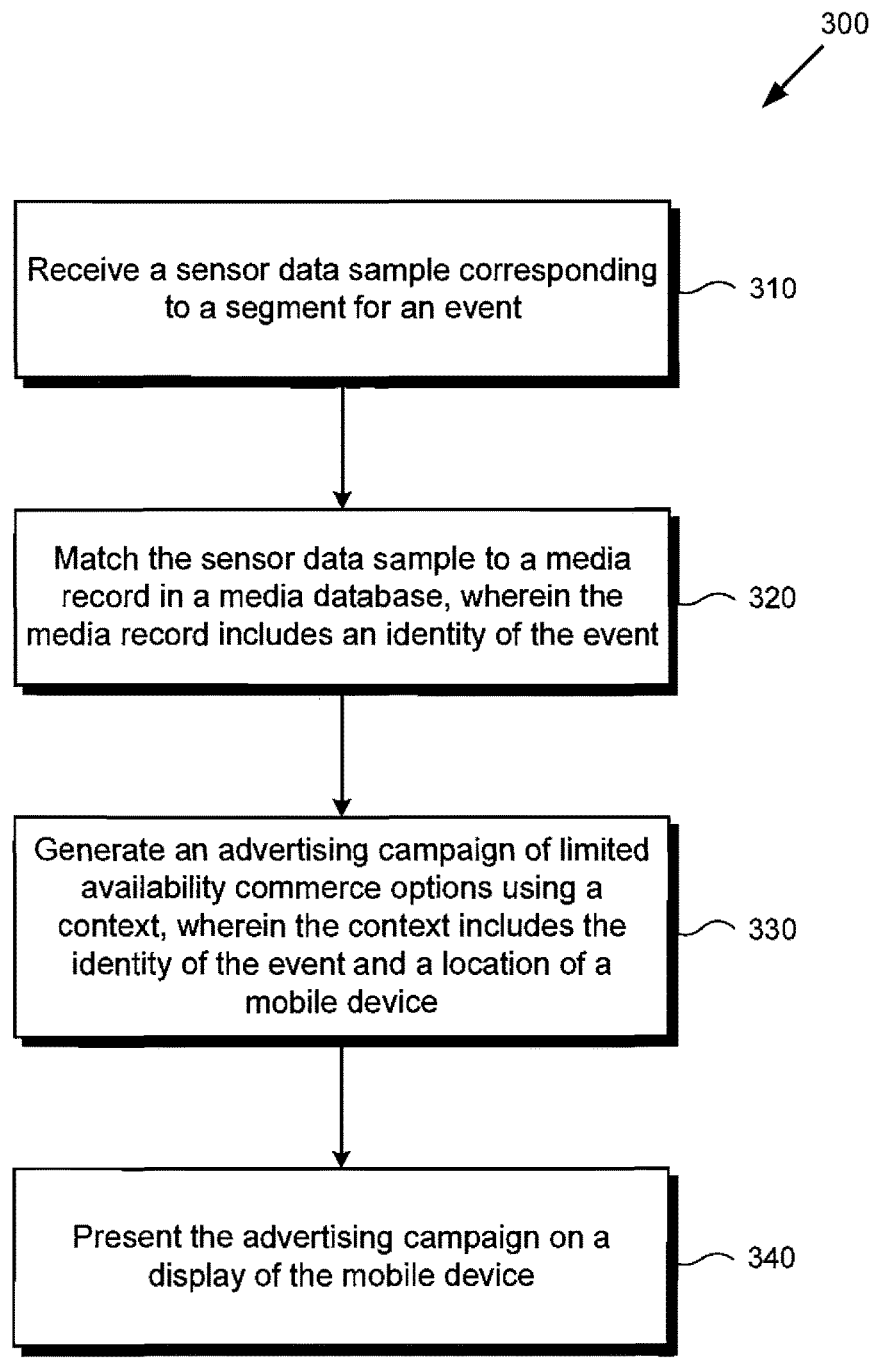
FIG. 3 shows a flowchart describing the steps, according to one embodiment of the present invention, by which event context-based commerce options may be provided.

Moving to FIG. 3, FIG. 3 shows a flowchart describing the steps, according to one embodiment of the present invention, by which event context-based commerce options may be provided. Certain details and features have been left out of flowchart 300 that are apparent to a person of ordinary skill in the art. For example, a step may comprise one or more sub-steps or may involve specialized equipment or materials, as known in the art. While steps 310 through 340 indicated in flowchart 300 are sufficient to describe on embodiment of the present invention, other embodiments of the invention may utilize steps different from those shown in flowchart 300.

Referring to step 310 of flowchart 300 in FIG. 3 and diagram 100 of FIG. 1, step 310 of flowchart 300 comprises processor 125 of device 110 receiving a sensor data sample corresponding to a segment, such as an ending segment, for an event. For example, application 120 executing on processor 125 may retrieve the sensor data sample from camera 111, light sensor 112, microphone 113, or any other sensor of device 110. However, for the purposes of the present example, it may be assumed that only sensor data samples from microphone 113 are retrieved. As shown in FIG. 1, the event may correspond to the theatrical showing of media 140 at event venue 160. Continuing with the "Doll Story" example as used above, media 140 may comprise the "Doll Story" movie and the ending segment may correspond to the first few measures of an ending song for the "Doll Story" ending credit roll.

As previously described, step 310 may be triggered automatically without any affirmative user intervention. For example, application 120 may operate continuously in the background, or application 120 may be automatically launched when GPS receiver 114 indicates proximity to an event venue, such as event venue 160. Application 120 may then continuously monitor data samples from microphone 113 until the ending segment of media 140 begins outputting through speakers 131, at which point step 310 begins.

Referring to step 320 of flowchart 300 in FIG. 3 and diagram 100 of FIG. 1, step 320 of flowchart 300 comprises processor 125 of device 110 matching the sensor data sample from step 310 to media record 173*a* in media database 172, wherein media record 173*a* includes an identity of the event. As previously described, processor 125 may forward the sensor data sample or a fingerprint of the sensor data sample to application server 170, which may then query media database 172 for a match. Alternatively, device 110 may cache portions of media database 172, in which case the query may be carried out directly by processor 125. Media database 172 may then return media record 173*a* as a match, where acoustic fingerprint 174*a* corresponds to the first few measures of the ending song for "Doll Story". However, as previously described, each media record may also include other digital fingerprints besides acoustic fingerprints, such as bar-codes and light intensity patterns, to assist in record matching to sensor data samples from device 110. Media record 173*a* may include an event identifier that indicates media 140 as the movie "Doll Story".

Referring to step 330 of flowchart 300 in FIG. 3 and diagram 100 of FIG. 1, step 330 of flowchart 300 comprises processor 125 of device 110 generating an advertising campaign of limited availability commerce options using a context, wherein the context includes the identity of the event retrieved from step 320 and a location of device 110. As previously described, the location of device 110 may be derived using GPS satellite 155 and GPS receiver 114, or by alternative location tracking methods such as Wi-Fi triangulation. The context may also include other data such as user profile information for device 110. Processor 125 of device 110 may forward the context to application server 170 for querying against marketing database 180, which may then return the advertising campaign of commerce options back to application 120.

Thus, as previously discussed, the advertising campaign may be context-based and targeted towards the user of device 110. By using the identity of media 140, the advertising campaign can offer contextually related goods and services such as physical or download media of the "Doll Story" movie and restaurant or entertainment options targeted towards a family friendly demographic of the "Doll Story" movie. By using the location of device 110, the commerce options can be tailored to favor promotions from partners and retailers in close proximity to device 110. By using user profile information of device 110, the commerce options can be further targeted towards preferences and behaviors of the user. For example, restaurants may be filtered based on preferred cuisines of the user. Additionally, some of the commerce options may be made exclusive to application 120 to stoke interest and encourage sales, and group discount elements may be provided to encourage impulse purchases and social network effects. For example, limitations based on time, location, demographics, user or group participation, and other criteria may restrict the availability of some of the commerce options.

Referring to step 340 of flowchart 300 in FIG. 3 and diagram 100 of FIG. 1, step 340 of flowchart 300 comprises processor 125 of device 110 presenting the advertising campaign generated from step 330 on display 115. Display 115 may appear similar to the user interfaces shown in display 215 of FIG. 2A and displays 215*a* through 215*d* of FIG. 2B. As previously described, application 120 may also alert the user by playing an audible chime or vibrating device 110. In this manner, the user's attention may be directed towards display 115, which may advantageously display various context-based commerce options to the user immediately after the end of the event, when the user may be most interested in purchasing related goods and services.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A method for providing commerce options through a mobile device having a processor, a sensor and a display, the method comprising:
sensing, using the sensor, a credit roll segment of a movie being shown;
converting, by the processor, the sensed credit roll segment of the movie to a sensor data sample corresponding to the sensed credit roll segment of the movie;
transmitting, by the processor, the sensor data sample to a server;
receiving, by the processor, from the server, an advertising campaign generated by the server based on an identity of the movie determined by the server by matching the sensor data sample to a media record corresponding to the movie in a media database, and identifying the movie using the media record corresponding to the movie, wherein the media record includes the identity of the movie; and
displaying, by the processor, the advertising campaign on the display of the mobile device.

2. The method of claim 1, wherein the advertising campaign includes a commerce option limited by a location of the mobile device being within a proximity of a location of a movie theater of the one or more movie theaters showing the movie.

3. The method of claim 1, wherein the advertising campaign includes a commerce option limited by a time window.

4. The method of claim 1, wherein the advertising campaign includes a commerce option limited by the mobile device reaching a participation threshold in an activity.

5. The method of claim 4, wherein the activity is a group activity including nearby mobile devices.

6. The method of claim 1, wherein the sensor is at least one of a microphone, a light sensor and a camera.

7. The method of claim 1, wherein the transmitting further transmits a user profile of the mobile device to the server, and wherein the advertisement campaign is further based on the a user profile of the mobile device.

8. The method of claim 1, wherein the sensing of the segment of the movie is in response to detecting a location of the mobile device within a proximity of a location of a movie theater of the one or more movie theaters showing the movie.

9. The method of claim 1, wherein the advertising campaign includes a commerce option for purchasing a copy of the movie.

10. A mobile device:
a display;
a sensor configured to sense a credit roll segment of a movie being shown; and
a processor configured to:
convert the sensed credit roll segment of the movie to a sensor data sample corresponding to the sensed credit roll segment of the movie;
match the sensor data sample to a media record corresponding to the movie in a media database;
identify the movie using the media record, wherein the media record includes an identity of the movie;
generate an advertising campaign using a context, wherein the context includes the identity of the movie; and
display the advertising campaign on the display of the mobile device.

11. The mobile device of claim 10, wherein the advertising campaign includes a commerce option limited by a location of the mobile device being within a proximity of a location of a movie theater of the one or more movie theaters showing the movie.

12. The mobile device of claim 10, wherein the advertising campaign includes a commerce option limited by a time window.

13. The mobile device of claim 10, wherein the advertising campaign includes a commerce option limited by the mobile device reaching a participation threshold in an activity.

14. The mobile device of claim 13, wherein the activity is a group activity including nearby mobile devices.

15. The mobile device of claim 10, wherein the sensor is at least one of a microphone, a light sensor and a camera.

16. The mobile device of claim 10, wherein the context further includes a user profile of the mobile device.

17. The mobile device of claim 10, wherein the processor is configured to sense the segment of the movie in response to detecting a location of the mobile device within a proximity of a location of a movie theater of the one or more movie theaters showing the movie.

18. The mobile device of claim 10, wherein the advertising campaign includes a commerce option for purchasing a copy of the movie.

* * * * *